(12) United States Patent
Lichtenstein et al.

(10) Patent No.: US 7,497,972 B2
(45) Date of Patent: Mar. 3, 2009

(54) PLASTIC MOLDED BODY CONTAINING A FLUORESCENT DYE

(75) Inventors: Hans Lichtenstein, Reinheim (DE); Guenther Ittmann, Gross-Umstadt (DE); Eduard Albrecht, Frankfurt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 202 days.

(21) Appl. No.: 10/521,769

(22) PCT Filed: Jul. 25, 2003

(86) PCT No.: PCT/EP03/08213

§ 371 (c)(1), (2), (4) Date: Jan. 19, 2005

(87) PCT Pub. No.: WO2004/033543

PCT Pub. Date: Apr. 22, 2004

(65) Prior Publication Data

US 2005/0288416 A1 Dec. 29, 2005

(30) Foreign Application Priority Data

Sep. 24, 2002 (DE) ............................. 102 44 706

(51) Int. Cl.
*C08K 3/22* (2006.01)
*C08K 3/30* (2006.01)

(52) U.S. Cl. .................. 252/301.35; 428/690; 524/497; 524/432; 524/418; 524/445; 524/451; 524/449; 524/447; 524/425; 524/577; 524/556; 524/605; 524/611; 524/551; 524/570; 524/430

(58) Field of Classification Search ............ 252/301.35, 252/301.34; 428/690; 524/497, 432, 418, 524/445, 451, 449, 447, 425, 577, 556, 605, 524/611, 551, 570, 430
See application file for complete search history.

(56) References Cited

U.S. PATENT DOCUMENTS

| 4,773,913 | A | 9/1988 | Krieg et al. |
| 4,820,760 | A * | 4/1989 | Ali et al. .................. 524/423 |
| 4,957,987 | A | 9/1990 | Krieg et al. |
| 5,449,727 | A | 9/1995 | Krieg et al. |
| 6,375,864 | B1 * | 4/2002 | Phillips et al. ......... 252/301.33 |
| 2004/0264159 | A1 | 12/2004 | Schmidt et al. |
| 2005/0002189 | A1 | 1/2005 | Lichtenstein et al. |

FOREIGN PATENT DOCUMENTS

| CA | 2091110 | | 9/1993 |
| EP | 0 559 083 | | 9/1993 |
| EP | 0 570 782 | | 11/1993 |
| JP | 06-67612 | * | 3/1994 |
| WO | 02/052314 | | 7/2002 |

OTHER PUBLICATIONS

Derwent abstract for EP 553083.*
U.S. Appl. No. 10/553, 967, filed Oct. 19, 2005, Lichtenstein et al.
U.S. Appl. No. 12/084,991, filed May 14, 2008, Lichtenstein et al.
U.S. Appl. No. 11/575,409, filed Mar. 16, 2007, Lichtenstein et al.

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

The invention relates to a moulding composed of a plastics matrix composed of a transparent plastic, comprising a soluble fluorescent dye and a scattering agent whose refractive-index difference from the plastics matrix is +/− from 0.003 to 0.2, characterized in that a white pigment whose refractive-index difference from the plastics matrix is from +0.4 to 1.5 is also present, at a concentration of from 0.001 to 0.1% by weight.

10 Claims, No Drawings

PLASTIC MOLDED BODY CONTAINING A FLUORESCENT DYE

CROSS REFERENCES TO RELATED APPLICATIONS

This application is a national stage application of International Patent Application No. PCT/EP03/08213, filed on Jul. 25, 2003, and claims priority to German Patent Application No. 102 44 706.3, filed on Sep. 24, 2002, both of which are incorporated herein by reference in their entireties.

The invention relates to a moulding composed of plastic, comprising a fluorescent dye.

PRIOR ART

EP-A 0 559 083 describes lamps made from plastic and comprising a fluorescent dye and a white pigment, e.g. $TiO_2$ or $BaSO_4$, at concentrations of from 0.1 to 5% by weight. Other pigments may also be present.

OBJECT AND ACHIEVEMENT THEREOF

Mouldings, in particular plastics sheets made from cast polymethyl methacrylate, comprising a fluorescent dye and $BaSO_4$ as scattering agent in accordance with EP-A 0 553 083 are known. Starting from this prior art, the intention was in particular to improve the brightness of colour of the mouldings.

The object is achieved by way of a moulding composed of a plastics matrix composed of a transparent plastic, comprising a soluble fluorescent dye and a scattering agent whose refractive-index difference from the plastics matrix is +/– from 0.003 to 0.2, characterized in that a white pigment whose refractive-index difference from the plastics matrix is from +0.4 to 1.5 is also present, at a concentration of from 0.001 to 0.1% by weight.

Surprisingly, the effect of addition of the white pigment at an unusually low concentration is a marked rise in colour brightness. The mouldings of the invention in particular have a reflectance which, measured in % using a spectrophotometer to DIN 5036, is higher by at least 10% than that of a corresponding moulding without white pigment. This rise in brightness in colour is clearly discernible, even by the naked eye.

DESCRIPTION OF THE INVENTION

The invention provides mouldings composed of a plastics matrix composed of a transparent plastic, comprising a soluble fluorescent dye, optionally combined with further colorants (pigments, dyes), and a scattering agent whose refractive-index difference from the plastics matrix is +/– from 0.003 to 0.2, characterized in that a white pigment whose refractive-index difference from the plastics matrix is from +0.4 to 1.5 is also present, at a concentration of from 0.001 to 0.1% by weight.

Fluorescent Dyes

The moulding comprises soluble fluorescent dyes known per se, e.g. those based on the perylenes class of chemical compounds.

WO 99/16847 describes fluorescent dyes which are soluble in plastics, e.g. polycarbonate, polymethyl methacrylate, polyvinylidene fluoride, or a mixture of polymethyl methacrylate and polyvinylidene fluoride, and are suitable for items or mouldings which have yellow fluorescence. The fluorescent dyes are mixtures of N,N'-disubstituted 3,4:9,10-perylenebis(dicarboximide) and dyes with yellow fluorescence, with defined colour coordinate ranges in accordance with the CIE 1931 Standard calorimetric system, and with fluorescence/luminescence factors greater than 5.

The commercially available fluorescent dyes Lumogen® F Orange 240, Lumogen® F Yellow 083, Lumogen® F Red 240 (Lumogen®: trade mark of BASF AG, Ludwigshafen, Germany), and also Hostasol® Yellow 3G, are particularly suitable for the purposes of the invention.

Other Colorants

The fluorescent dyes may be present in combination with other colorants. Examples of other colorants are pigments and dyes, in particular non-fluorescent dyes. Examples of other colorants are copper phthalocyanine green, copper phthalocyanine blue, iron oxide red, ultramarine blue, chromium titanium yellow, dyes of the anthraquinone series. The combination of fluorescent dyes with other colorants enables a relatively large colour spectrum to be covered. For example, the combination of a fluorescent dye having yellow fluorescence with a green pigment, e.g. copper phthalocyanine green, is useful for producing a bright green fluorescence. Other colorants may be present, for example in amounts of from 0.001 to 1% by weight, preferably from 0.01 to 0.5% by weight.

Scattering Agents

Scattering agents are insoluble additives of small size, e.g. in the range from 1 μm to 1 mm, which can be incorporated into the matrix plastic. These scattering agents have a refractive-index difference in the range from +/–0.003 to 0.2.

Examples of suitable scattering agents are aluminium hydroxide, aluminium potassium silicate (mica), aluminium silicate (kaolin), barium sulphate, calcium carbonate, magnesium silicate (talc), polystyrene, and/or light-scattering beads composed of crosslinked plastic. Light-scattering beads composed of copolymers composed of methyl methacrylate and styrene or benzyl methacrylate, where these may also have been crosslinked, are known, for example from DE 35 28 165 C2, EP 570 782 B1 or EP 656 548 A2.

White Pigment

The white pigment has a refractive-index difference from the plastics matrix of from +0.4 to 1.5, preferably from +0.5 to 1.4, particularly preferably from 1.0 to 1.3, and is present at a concentration of from 0.001 to 0.1% by weight, preferably from 0.005 to 0.01% by weight, in the plastics matrix.

Examples of preferred white pigments are titanium dioxide ($TiO_2$), zinc oxide (ZnO) or zinc sulphide (ZnS).

Moulding

The moulding according to the invention has reflectance, measured in % using a spectrophotometer to DIN 5036, which is higher by at least 10%, preferably at least 15%, in particular at least 20%, than that of a corresponding moulding without white pigment.

The mouldings of the invention may be obtained after incorporation of the fluorescent dye and, where appropriate, of other colorants into the appropriate plastics, or into the plastics matrix, prior to or after the polymerization thereof. Examples of incorporation methods, as required by the process, are by stirring in, the use of kneaders, application in a mixing drum, direct feed, or the addition of highly concentrated masterbatches into a polymerizable plastics syrup or into the melt of a thermoplastic polymer. The resultant coloured plastics material may be further processed in a manner known per se, e.g. by extrusion, injection moulding, thermoforming, machining, etc.

The moulding may be practically any desired moulding. Preferred shapes are sheets, pipes, or rods.

Plastics

The transparent plastic of the plastics matrix has a transmittance in the visible range of at least 40%, preferably at least 50%, particularly preferably at least 70%, in particular at least 80% (light transmittance for daylight (D65 standard illuminant) TD65, see, for example, DIN 67 507). Preference is given to plastics which are thermoelastic or thermoplastic.

The transparent plastic of the plastics matrix may be extruded polymethyl methacrylate, cast polymethyl methacrylate, impact-modified polymethyl methacrylate, polycarbonate, polystyrene, styrene-acrylonitrile, polyethylene terephthalate, glycol-modified polyethylene terephthalate, polyvinyl chloride, transparent polyolefin, acrylonitrile-butadiene-styrene (ABS) and/or a mixture (blend) of the plastics mentioned.

Uses

Examples of possible uses of the mouldings of the invention are for vehicle bodywork, designer furniture, signage, or parts thereof, or for lighting systems, e.g. for illuminated advertising installations. Even normal daylight is usually sufficient to excite the fluorescence. There may also be active illumination, e.g. by means of fluorescent tubes or, where appropriate, with LEDs.

EXAMPLES

Solution 1 part of 2,2'-azobis(2,4-dimethylvaleronitrile) and the colorants of Tab. 1 are dissolved in 1000 parts of methyl methacrylate prepolymer (viscosity about 1000 cP).

A colour paste composed of 3 parts by weight of a soluble polymethyl methacrylate resin,
10 parts by weight of barium sulphate, and, depending on the experiment, the amounts (% by weight) given in Table 1 of titanium dioxide and, respectively, zinc sulphide,
this being dispersed in
30 parts by weight of methyl methacrylate, using a high-speed disperser (rotor/stator principle)

is added to the above mixture.

The mixture is vigorously stirred, charged to a silicate glass cell using a bead of thickness 3 mm as spacer, and polymerized in a water bath at 45° C. The final polymerization takes place at 115° C. in a temperature-controlled cabinet.

Colour locus (L*, a*, B*) is measured using a spectrophotometer to DIN 5033.

TAB. 1

| Exp. No. | Titanium dioxide | Zinc sulphide | Lumogen F Orange 240 | Lumogen F Yellow 083 | Lumogen F Red 305 | Hostasol Yellow 3G |
|---|---|---|---|---|---|---|
| 113T | — | — | 0.05 | — | — | — |
| 144M | 0.0075 | — | 0.05 | — | — | — |
| 113Q | — | — | — | 0.05 | — | — |
| 144K | 0.0075 | — | — | 0.05 | — | — |
| 113S | — | — | — | — | 0.05 | — |
| 144E | — | 0.0125 | — | — | 0.05 | — |
| 144G | 0.0075 | — | — | — | 0.05 | — |
| 148A | — | — | — | — | — | 0.05 |
| 148F | 0.0075 | — | — | — | — | 0.05 |

Data: in % by weight

Results

TAB. 2

CIELAB reflection colour values L, a, b for D65/10° illuminant

| Exp. No. | Shade | L* | a* | b* | Reflectance in % | Visual assessment in D65 daylight |
|---|---|---|---|---|---|---|
| 113T | orange | 56.29 | 23.66 | 94.86 | 24.2 | yellowish-orange fluorescence, somewhat cloudy |
| 144M | orange | 66.10 | 29.80 | 105.55 | 35.5 | yellowish-orange fluorescence, very bright |
| 113Q | yellowish green | 62.34 | −31.70 | 80.00 | 30.8 | yellow fluorescence, somewhat cloudy |
| 144K | yellowish green | 70.53 | −31.21 | 90.56 | 41.5 | yellow fluorescence, very bright |
| 113S | red | 34.77 | 60.93 | 59.94 | 8.4 | red fluorescence, somewhat cloudy |
| 144E | red | 37.81 | 65.73 | 59.53 | 10.0 | red fluorescence, very bright |
| 144G | red | 37.40 | 64.83 | 58.77 | 9.8 | red fluorescence, very bright |
| 148A | yellow | 64.40 | −30.14 | 90.36 | 33.3 | yellow fluorescence, somewhat cloudy |
| 148F | yellow | 72.31 | −28.77 | 99.64 | 44.1 | yellow fluorescence, very bright |

As can be seen from the colour values, and also from visual assessment, the products produced using the barium sulphate/titanium dioxide (zinc sulphide) combination have markedly greater brightness of shade. Red has a higher red value, yellow has a higher yellow value, etc. The improvement is also clearly detectable visually.

The invention claimed is:

1. A moulding, comprising:
a plastic matrix which comprises a transparent plastic,
a soluble fluorescent dye, a scattering agent whose refractive-index difference from said plastic matrix is +/− from 0.003 to 0.2, and 0.001 to 0.1% by weight of a white pigment whose refractive-index difference from said plastic matrix is from +0.4 to 1.5; and wherein said scattering agent is selected from the group consisting of polystyrene, light-scattering beads comprising crosslinked plastic, mixtures of barium sulphate and polystyrene, mixtures of barium sulphate and light-scattering beads comprising crosslinked plastic, and mixtures thereof.

2. The moulding according to claim 1, wherein said white pigment is titanium dioxide, zinc oxide or zinc sulphide.

3. The moulding according to claim 1, wherein the reflectance of said moulding is higher by at least 10% than that of a corresponding moulding without white pigment.

4. The moulding according to claim 1, wherein said transparent plastic has a transmittance of at least 40% in the visible region.

5. The moulding according to claim 1, wherein said transparent plastic is selected from the group consisting of extruded polymethyl methacrylate, cast polymethyl methacrylate, impact-modified polymethyl methacrylate, polycarbonate, polystyrene, styrene-acrylonitrile, polyethylene terephthalate, glycol-modified polyethylene terephthalate, polyvinyl chloride, transparent polyolefin, acrylonitrile-butadiene-styrene and mixtures thereof.

6. The moulding according to claim 1, wherein the fluorescent dye is present in combination with other colorants.

7. The moulding according to claim 6, wherein said fluorescent dye is combined with another colorant;
wherein an amount of said another colorant is from 0.001 to 1% by weight.

8. The moulding according to claim 1, wherein said white pigment is present in an amount of from 0.001 to 0.0075% by weight.

9. The moulding according to claim 1, wherein said white pigment is present in an amount of from 0.001 to 0.01% by weight.

10. An article, comprising:
the moulding as claimed in claim 1, wherein said article is a vehicle bodywork, a designer furniture, signage, a lighting system, or one or more parts thereof.

* * * * *